US012692183B2

(12) United States Patent (10) Patent No.: US 12,692,183 B2
Jafari (45) Date of Patent: Jul. 28, 2026

(54) SEALING GLASS AMPULES USING ELECTRICITY GENERATED PLASMA ARC

(71) Applicant: Seyed Mohammadreza Jafari, Unionville (CA)

(72) Inventor: Seyed Mohammadreza Jafari, Unionville (CA)

( * ) Notice: Subject to any disclaimer, the term of this patent is extended or adjusted under 35 U.S.C. 154(b) by 929 days.

(21) Appl. No.: 17/462,187

(22) Filed: Aug. 31, 2021

(65) Prior Publication Data

US 2022/0064048 A1 Mar. 3, 2022

Related U.S. Application Data

(60) Provisional application No. 63/072,395, filed on Aug. 31, 2020.

(51) Int. Cl.
| | |
|---|---|
| *C03B 23/18* | (2006.01) |
| *B23K 10/00* | (2006.01) |
| *B23K 10/02* | (2006.01) |
| *H05H 1/34* | (2006.01) |
| *H05H 1/36* | (2006.01) |
| *B23K 101/12* | (2006.01) |
| *B23K 103/00* | (2006.01) |

(52) U.S. Cl.
CPC ............ *C03B 23/18* (2013.01); *B23K 10/006* (2013.01); *B23K 10/027* (2013.01); *H05H 1/3494* (2021.05); *H05H 1/36* (2013.01); *B23K 2101/12* (2018.08); *B23K 2103/54* (2018.08)

(58) Field of Classification Search
CPC ............ B23K 2103/54; B23K 2101/12; B23K 10/027; B23K 10/006; H05H 1/36; H05H 1/3494; C03B 23/18

USPC ..................................................... 219/121.36
See application file for complete search history.

(56) References Cited

U.S. PATENT DOCUMENTS

| | | | | | |
|---|---|---|---|---|---|
| 2,479,024 | A | * | 8/1949 | Font | C03B 23/18 53/97 |
| 2,956,372 | A | * | 10/1960 | Madigan | H01J 9/40 65/110 |
| 3,375,948 | A | * | 4/1968 | Creevy | C03B 23/18 215/901 |
| 3,437,471 | A | * | 4/1969 | Bott | C03B 23/18 65/270 |
| 3,923,487 | A | * | 12/1975 | Lewis | C03B 23/18 65/110 |
| 4,465,501 | A | * | 8/1984 | Lemonnier | C03B 23/18 65/270 |

(Continued)

FOREIGN PATENT DOCUMENTS

JP 02080336 A * 3/1990

*Primary Examiner* — Jimmy Chou
(74) *Attorney, Agent, or Firm* — Nasser Ashgriz; UIPatent Inc.

(57) ABSTRACT

The present invention is an electrical device that can seal an array of glass ampules and micro ampules using plasma arc produced by electricity. The device can produce high temperature by making mini plasma arcs which will melt down the glass and make a permanent seal. The arc is produced in a sealing head which covers the plasma arc and can focus the heat in a very small area so that the heat can be directly transferred to the glass without any intermediate, thereby increasing the efficiency. The plasma arc can increase the heat by using multiplication of the arcs encased in the sealing head.

15 Claims, 6 Drawing Sheets

(56) References Cited

U.S. PATENT DOCUMENTS

| 10,442,718 | B2 * | 10/2019 | Maennl | ................... | C03B 23/11 |
| 2002/0179575 | A1 * | 12/2002 | Fornsel | ................... | H05H 1/34 |
| | | | | | 219/121.51 |
| 2004/0045319 | A1 * | 3/2004 | Schussler | ................ | C03B 20/00 |
| | | | | | 65/276 |

* cited by examiner 31
32
33
34

35

36

37

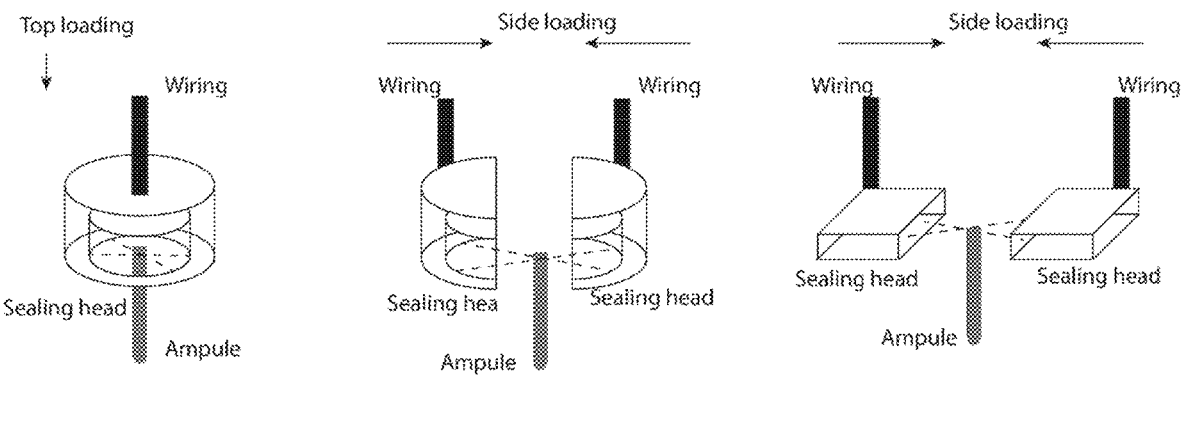
FIG. 6A                    FIG. 6B                    FIG. 6C

SEALING GLASS AMPULES USING ELECTRICITY GENERATED PLASMA ARC

FIELD OF THE INVENTION

The present invention relates in general to sealing glass ampules and in particular to sealing glass ampules by melting the glass with one or multiple high temperature plasma arc that is generated by high voltage electricity.

BACKGROUND OF THE INVENTION

The analysis of any chemical specimen relies on accurate measurement of the sample against standards. Chemical standards, however, are usually vulnerable to change in quality and concentration in ambient environment due to various physical and chemical changes, such as exposure to atmospheric oxygen, humidity, and evaporation. It is important to prepare, store and ship analytical standards as close as possible to its primary form right after production.

To preserve analytical standards and other types of solutions from molecular exchange with the environment, a sample must be sealed in the container right after production. Methods other than sealing, such as capping with screw caps and snap caps cannot effectively prevent environmental exposure of the sample. The only effective method to preserve a chemical solution is to store it in a sealed container. Both plastic and glass are usually used as a sealable storage container material, with the glass being the preferred material due to its resistance to chemicals and being non-flammable.

Currently the most common method for sample storage is in plastic or glass ampules. Glass ampules are flamed sealed. A flame is usually produced using a combustible gas, such as propane and butane, and sometimes in combination with high a concentration oxygen to generate a higher temperature flame. Large scale flame ampule sealers have been streamlined to be used in pharmaceutical industry. Lab scale glass ampule sealers, such as Ampulmatic are also available in both manual and automatic format.

There are several drawbacks in using a flame for sealing. A flame may expose a sample to a high temperature and it may result in explotion and fire risk to the building and the business. Also, handling and use of flammable gasses is subject to very strict regulations with extra costs to the business. In addition, moisture generated by the combustion of the gases can affect the quality of moisture sensitive specimens.

An alternative for a flame is a plasma, which has been long used for welding, cutting and sealing because of the high temperatures it generates. The current device utilizes a plasma arc for sealing of ampules for sample storage.

SUMMARY OF THE INVENTION

The present invention is an electrical device that can seal glass ampules and micro ampules using electrically produced plasma arc. The device can produce high temperatures by making mini plasma arcs, which will melt down the glass and make a permanent seal. The device works with a 110V or 220V standard plug, which is available in small labs. Additionally, the device can work with rechargeable Li-ion or acid-lead batteries, which makes it light and portable. We also disclose a system for simultaneously sealing a large number of ampules. The arc is produced in a sealing head, which covers the plasma arc, minimizing any exposure risk to the user and the area. The key aspect of the invention is melting glass with one or multiple plasma mini arcs. The plasma arc can focus the heat in a very small area with a diameter of 6 to 7 mm, which is the usual opening diameter of glass mini ampules (inserts). Using multiple mini-arcs that cross each other can elevate the heat up to 1,000° C. to 1700° C. to melt the glass.

The present device allows storage of highly sensitive formulations in mini-vials and inserts that are being handled and sealed in a small lab using a standard electrical plug or a battery. The sealed glass vials are the best solution for mixtures of organic solvents, where the solvent is not compatible with the plastic or other constituents of the container.

One advantage of the present system is that it is much safer than using flames, as it uses electricity to generate heat to seal a glass ampule, rather than a flame. Another advantage of the present system is that it has a small footprint. Another advantage of the present system is that it is easy to use and quick to implement, therefore, it has a significantly higher vial/second production rate than that of a flame sealing procedure. Another advantage of the present system is that it can be operated inside and inert gas environment, therefore, providing a better stability and less contamination in the process. Inert gas environment cannot be used in flame sealing process. The present device has an optional inlet for inert gases, such as nitrogen and Argon, which makes the contents highly stable towards ambient atmosphere.

The present system can be used in industry, research labs and even in households for sealing of vials. It is much safer, easier, and faster procedure in terms of vial/sec than the flame-based systems. The biopharma and analytical chemistry industries are highly dependent on high-quality air-resistant small-volume containers for storage and shipping material. Therefore, the pharmaceutical companies, fragrance producer and standards manufacturers can use the present invention to seal a filled ampule in standards facilities.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 6A shows one embodiment of the sealing head with a top loading round closed-top sealing head;

FIG. 6B shows another embodiment of the sealing head with a side loading round open-top sealing head, and FIG. 6C shows another embodiment of the sealing head with a side loading square open-top sealing head.

DETAILED DESCRIPTION OF PREFERRED EMBODIMENTS

Figure 1:
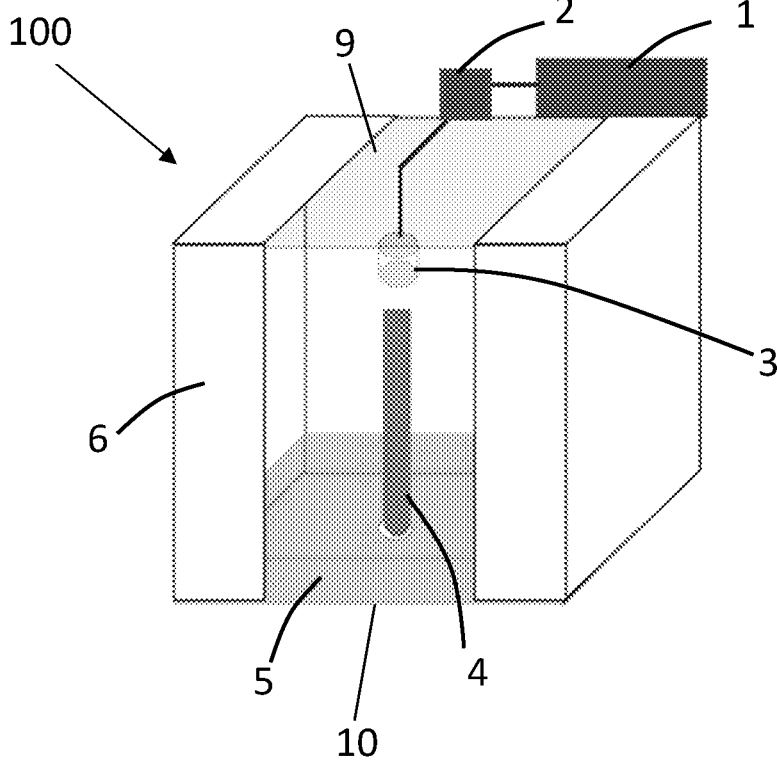
FIG. 1 shows a schematic view of a single glass sealing device according to the present invention.

The invention is designed to seal glass ampules with the heat generated from one or multiple plasma arc. FIG. 1 shows a schematic view of a simple glass sealing device 100. The device comprises of a chamber 6 to receive various parts of the device 100. A power source 1 is provided for the operation of the system. The power source can be a battery such as Lithium-Ion battery, or an industrial or home used power plug that can be regulated using a power management unit. The chamber 6 has a top lid 9 and a bottom surface 10. The top lid 9 comprising of one or more sealing heads 3 to seal one or more glass ampules 4.

The device 100 has a voltage boost inverter system on a circuit board 2. The inverter circuit 2 boosts up the voltage gained from the power source 1 to a voltage enough to make a plasma arc. An example of voltage conversion is 3.7V Li-Ion battery to 8 kV.

The device further comprises of a sealing head 3 that fits the wiring, which come from the inverter circuit 2 and carries a high voltage. The sealing head 3 also works as a fixture to arrange the wires for the best performance of plasma arc. The heat is focused inside the sealing head 3 to melt the glass ampule 4. The chemical or specimen is stored in a glass ampule 4. The glass ampule 4 is a container that can be made of any type of glass in variety of sizes, shapes, and colors.

The device 100 further has a tray 5 on the bottom surface. The tray can be a single place tray, or a multiple place tray based on the application of the device 100. In operation of the device in a typical workflow for a simple device with a single sealing head 3 as shown in FIG. 1, the power source 1 turns on and the circuit 2 converts the low voltage to a high voltage. The sealing head 3 forms the arc(s) and starts heating the glass, and the glass melts and comes together by itself or by using an external force to seal the ampule 4.

Figure 2:
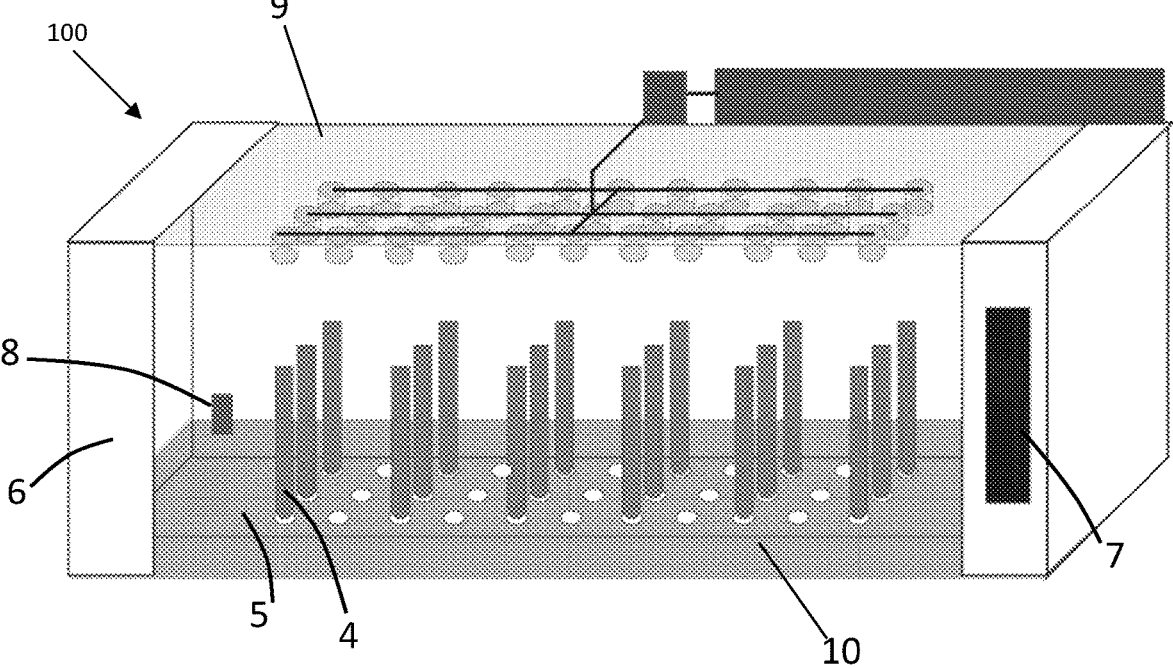
FIG. 2 shows a perspective view of the multiple glass sealing device according to the present invention.

As shown in FIG. 2 the device 100 can be equipped with multiplication of the sealing heads 3 to seal multiple ampules 4 at the same time. In this case a power management system (PMS) or a power regulator can be used to stabilize, manage, and improve the electrical current and voltage that passing through the system.

The device may have a neutral gas filling system for the chamber (NGFSC). A nitrogen or argon filling system will lead these neutral gasses to the chamber to purge out the ambient atmosphere and fill the sealing environment with a neutral gas.

The device may have a cooling system on the tray 5 to reduce the temperature of the environment or the temperature of the glass ampules 4 at the bottom, thereby increasing the stability and preventing of sample evaporation. The cooling tray 5 can use any technology for cooling including but not limited to Peltier effect, gas compression or cooling material filling.

The device may have a neutral gas filling system for the ampules (NGFSA). A nitrogen or argon filling system will lead a neutral gas inside the ampules to purge out the ambient atmosphere and fill the ampules 4 with a neutral gas.

The system may include electronic system management (including hardware and software). An electronic management board will control the flow and sequences of events in the device and acts as an intermediate between the device and the user. A controller display is used to display the data exported from the device and receive commands from the user.

FIG. 2 shows the glass sealing device 100 with multiple sealing heads 3 to seal an array of multiple glass ampules 4. A plurality of glass ampules 4 are placed on a Multi-place tray 5. The power source 1 turns on the system. The device has a voltage boost inverter and an event controller system on a circuit board 2 to check all the standard parameters. The multi-place tray 5 is equipped with internal cooling system and starts cooling the environment and the base of the device 100. The ampules 4 are placed in the tray and then the lid of the device is closed. The neutral gas filling system for the ampules (NGFSA) fills the vials with a neutral gas. The neutral gas filling system for the chamber (NGFSC) fills the chamber with a neutral gas. The device has a controller display 7 for the user to control the operation of various parts of the device.

The device 100 provides a Liquid filling system 8 that fills the ampules 4 with the solution. In this stage the power for the inverter circuit 2 turns on and converts low voltage to a high voltage. The sealing heads 3 form the arc(s) and start heating the glass. The glass melts and comes together to seal the ampules 4.

The electrical power can be received from any type of power source including but not limited to 110-240V AC current, batteries and solar generators. A power management system (PMS) can be designed or commercially supplied to provide a stable source of electricity when needed. Using a battery can make the system light, portable and cordless, suitable for small scale and benchtop application.

Figure 3:
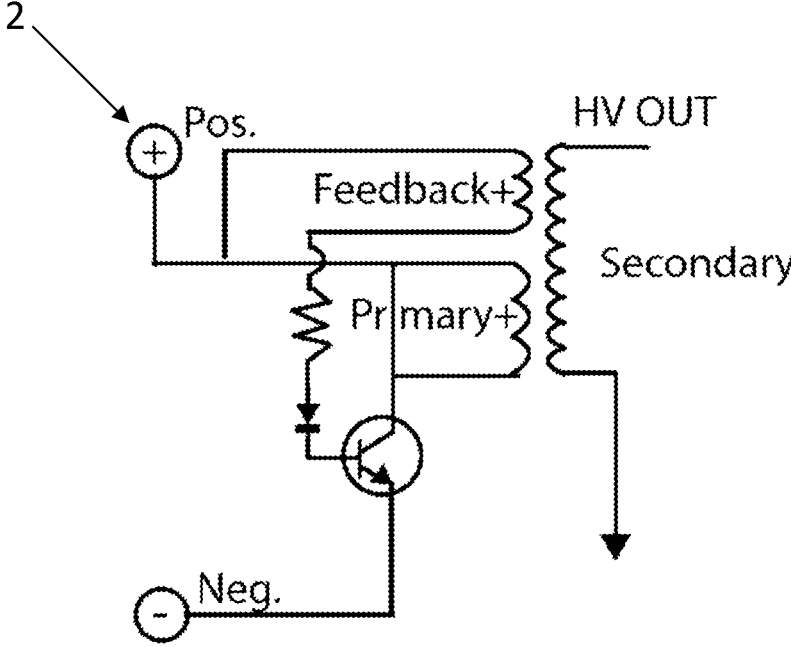
FIG. 3 shows a circuit of the voltage boost inverter of the present invention.

According to FIG. 3, the inverter circuit 2 is made of at least a power regulating transistor, a low voltage to high voltage transformer, a resistor, a diode and a current control key. The circuit 2 boosts low voltage to high voltage which results in ionization of the gas molecules and making a plasma arc. The high frequency flyback circuit shown here is a simple construct of one of the most common ways to boost up the voltage for generating plasma arcs. The circuit can be optimized/improved by adding other electronic components such as MOSFETS or PNP transistors, capacitors, inductors, heat sink, etc. Any electronic circuit that can boost up the device whether using a flyback or not can be used in our plasma arc sealing system. For each sealing head 3 the number of arcs can be increased until sufficient heat is generated. The number of arcs needed depends on the power in the circuit of each arc which is consequently related to the heat generated by a single arc. When multiple arcs are used in a sealing head, each arc may be the same or different in power/voltage/current/phase. When multiple arcs are required for a sealing head, either multiple circuit board or a consolidated board can be used.

A sealing head 3 and its cross sections is shown in FIG. 4A-D, where the arc(s) focuses the heat to melt the glass.

Figures 4A, 4B, 4C, 4D:
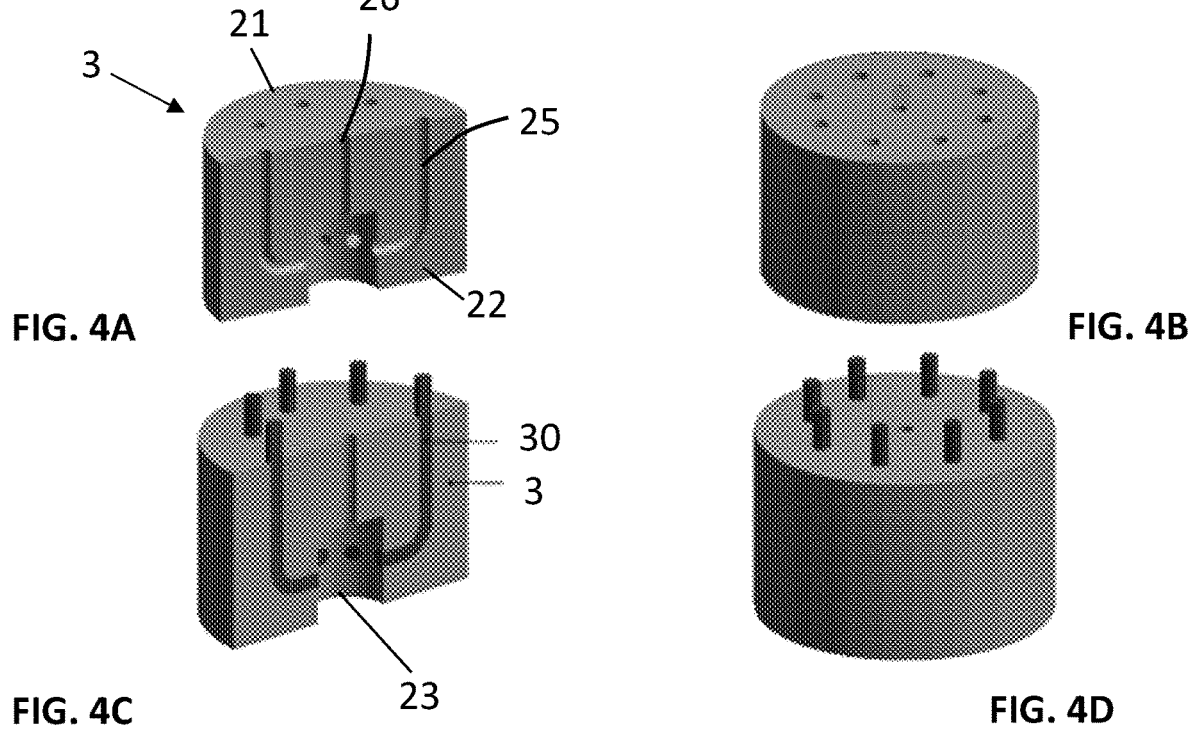
FIG. 4A is a cross sectional view of the sealing head without wires.
FIG. 4B is a perspective view of the sealing head without wires.
FIG. 4C is a cross sectional view of the sealing head with wires.
FIG. 4D is a perspective view of the sealing head with wires.

Each sealing head 3 comprising of a top section 21 and a bottom section 22, wherein the bottom section 22 has a cavity 23 configured to receive a top head of each glass ampule 4 to be sealed. FIGS. 4A and 4B show the cross section and the perspective view of the sealing head, showing the wire channels 25 and the inlet gas channel 26 inside the sealing head. Conductive high voltage wires 30 are passed through the channel from the transformer to form the electrode to fill the arcs in the sealing heads. The output wires 30 can be made of any conductive material with any size/diameter including but not limited to copper, gold, steel, aluminum and titanium. The body of the sealing head 3 can be made of a variety of material including but not limited to any type of glass, ceramic, plastic, plaster, rubber, metal, etc.

Figures 5A, 5B, 5C, 5D, 5E, 5F:
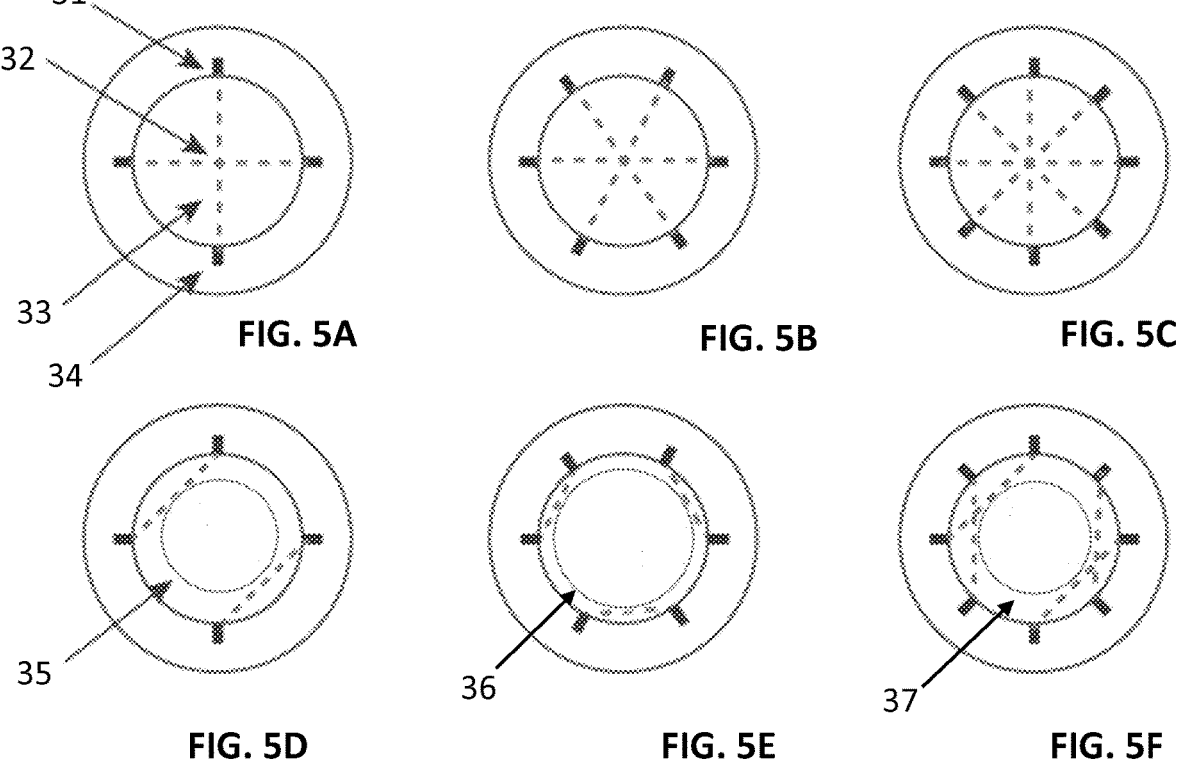
FIG. 5A shows one embodiment of the present sealing head with four electrodes generating two arcs focused at the center of the sealing head.
FIG. 5B shows another embodiment of the present sealing head with six electrodes generating three arcs focused at the center of the sealing head.
FIG. 5C shows another embodiment of the present sealing head with eight electrodes generating four arcs focused at the center of the sealing head.
FIG. 5D shows another embodiment of the present sealing head with four electrodes generating two arcs between two neighboring electrodes.
FIG. 5E shows another embodiment of the present sealing head with six electrodes generating three arcs around the perimeter of the sealing head.
FIG. 5F shows another embodiment of the present sealing head with eight electrodes generating four arcs around the perimeter of the sealing head.

FIG. 5A-F show different arrangement of the fire tips with two arcs in FIG. 5A, with three arcs, FIG. 5B, and with four arcs, FIG. 5C. The electrodes are controlled to generate arcs between different electrodes. The arc forms between the end of each wire (fire tips). For example, in FIG. 5A, an arc 33 is formed between electrodes 31 and 34. The distance between the fire tips 31 can be adjusted depending on the diameter of the glass ampules 4 and the output voltage of the transformer. When multiple arcs are needed, the fire tips 31 can be arranged so that the arcs cross each other and make a focus point 32. The zone of high temperare can be changed by firing different arc arrangement. The FIGS. 5D, 5E and 5F show three different arc firing arrangements, which result in different areas of high temperarures. For example, the effective temperare area 35 in FIG. 5D is smaller than that 36 in FIG. 5E, which is larger than that 37 of FIG. 5F. For example zone of high gVarious arc diaphragm arrangement 35 are shown in (D, E and F). The pair of fire tips 31 have various positioning for adjusting the radius of focus point 32 (diaphragm effect).

The sealing head 3 can have other arrangements and shapes. In one embodiment, an ampule can be placed in a closed top round sealing head as shown in FIG. 5 and FIG. 6A. FIG. 6B shows another embodiment of the sealing head with an open top. In this case, sealing head is configured to receive the ampules from the side. This arrangement is preferred for continuous loading of ampules in a conveyour belt. The ampules move in between the two parts of the sealing head and the arcs are fomed to seal them. The sealing head may have different shapes. In one embodiment, the sealing head is rectangular, as shown in FIG. 6C, with open top that can deliver the arcs from the sides of the ampule. In general, the sealing head acts as a fixture to secure the fire tips, wiring, sensors, etc., in an optimal place to generate and keep the plasma arc and it may be made in different shapes, sizes and material.

The system 100 can be equipped with nozzles for liquid filling or neutral gas filling system for ampules (NGFSA). The NGFSA will direct a flow of neutral gas such as $N_2$ or Argon through the ampule to discard off the ambient air prior to sealing or filling.

Traditionally, a high resistance metallic element is used to generate heat from electricity. The drawback of this method is that the element is highly prone to damage due to oxidation/melting. To avoid the damage, the element is usually protected by a layer of ceramic or high melting point metal, which reduces the efficiency of the heating elements due to the heat exchange of the covering material with the environment. US Patent application 2004/0045319A1 describes sealing ampule with plasma jet mechanism. This method, however, relies on a flow of air or other gasses to carry high temperature ion to the surface of the glass. Using plasma arcs as describes in the present invention the heat can be directly transferred to the glass without any intermediate which increases the efficiency. Additionally, commercial heating mini-elements that can heat up to 1,000-1,700° C. are rare and custom production is costly. Another advantage of plasma arc is that the heat can be increased by multiplication of the arcs encased in the sealing head. Placing an array of sealing heads in a single device makes it possible to seal tens to hundreds of glass ampules and micro-tubes in a short time. For example, an array of 8×12 of heating head with a small footprint of 30 cm×20 cm can seal 96 vials in 15 sec, with a speed of 0.15 s/vial.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The invention claimed is:

1. A glass sealing device, comprising:
   a) a tray to receive and hold one or more glass ampules, each glass ampule have a top and a bottom;
   b) one or more sealing heads to seal said one or more glass ampules, each sealing head is:
      i) a closed-top sealing head or an open-top sealing head, wherein the closed-top sealing head has a bottom cavity configured to receive the top of each glass ampule, the open-top sealing head is a two-piece sealing head each having a side cavity, wherein the top of each glass ampule is placed in between said side cavities;
      ii) a set of conductive wires passed through each sealing head to form a set of electrodes in the bottom cavity of the closed-top sealing head or in the side cavities of the open-top sealing head;
   c) a power source to generate a set of plasma arcs between each set of electrodes across the bottom cavity or side cavities to heat, melt and seal the top head of each glass ampule.

2. The glass sealing device of claim 1, wherein the power source comprising a voltage boost inverter and an event controller system on a circuit board to control the operation of the set of plasma arcs.

3. The glass sealing device of claim 2, wherein the voltage boost inverter inverts a 3.7V Li-Ion battery to 8 kV.

4. The glass sealing device of claim 1, further comprising a power management system (PMS) or a power regulator to stabilize, manage, and improve an electrical current that passes through the glass sealing device.

5. The glass sealing device of claim 1, further comprising a cooling system in communication with each glass ampule to reduce the temperature of the environment or the temperature of the set of glass ampules, thereby increasing the stability and preventing sample evaporation.

6. The glass sealing device of claim 5, wherein the cooling system is a Peltier system.

7. The glass sealing device of claim 1, further comprising a neutral gas filling system (NGFSA) for the ampules, wherein a neutral gas is injected onto the set of ampules to purge out an ambient atmosphere and fill the ampules with a neutral gas.

8. The glass sealing device of claim 1, wherein each sealing head comprises of two arcs, or three arcs, or four arcs.

9. The glass sealing device of claim 1, wherein said set of electrodes are configured to generate a set of plasma arcs that cross one another to generate a high temperature focal zone.

10. The glass sealing device of claim 1, further having an electronic management board to control a set of sequences of events in the device and to act as an intermediate between the device and a user, and to displays a set of data exported from the device and to receive a set of commands from the user.

11. The glass sealing device of claim 1, wherein the sealing head is made of an insulating material.

12. A glass sealing device, comprising:

a) a chamber having a bottom surface and a top lid to close the chamber;

b) a tray to receive and hold one or more glass ampules, wherein the tray is placed inside the chamber on the bottom surface;

c) the top lid comprising of one or more sealing heads to seal one or more glass ampules, wherein each glass ampule have a top and a bottom, and wherein each sealing head comprising of a closed-top sealing head or an open-top sealing head, wherein the closed-top sealing head has a bottom cavity configured to receive the top of each glass ampule to be sealed, and a set of conductive wires passed through the top lid to each cavity forming a set of electrodes in each bottom cavity, whereby the electrodes can generate a set of plasma arcs across each bottom cavity;

d) a power source to generate a set of plasma arcs between each set of electrodes to heat, melt and seal the top head of each glass ampule.

13. The glass sealing device of claim 12, further having a gas inlet to fill the chamber and the ampules with a neutral gas.

14. The glass sealing device of claim 12, further comprising a neutral gas filling system (NGFSC) for the chamber, wherein a nitrogen or an argon filling system fills the chamber to purge out an ambient atmosphere and fill the sealing environment with a neutral gas.

15. He glass sealing device of claim 12, further having a controller display for the user to operate the device, whereby once the ampules are filled with a solution, the power for an inverter circuit turns on and converts low voltage to a high voltage, and the sealing heads forms arcs and start heating the glass, whereby the glass melts and comes together to seal the ampules.

* * * * *